Sept. 24, 1957 F. G. STEELE 2,807,716

CORRELATION OF FLIP-FLOP AND DIODE GATING CIRCUITRY

Filed Aug. 24, 1953

INVENTOR.
FLOYD G. STEELE
BY Hugh L. Millis Jr.

United States Patent Office 2,807,716

Patented Sept. 24, 1957

2,807,716

CORRELATION OF FLIP-FLOP AND DIODE GATING CIRCUITRY

Floyd G. Steele, La Jolla, Calif., assignor to Digital Control Systems, Inc., La Jolla, Calif., a corporation of California Application August 24, 1953, Serial No. 375,913

7 Claims. (Cl. 250—27)

Figure 1:
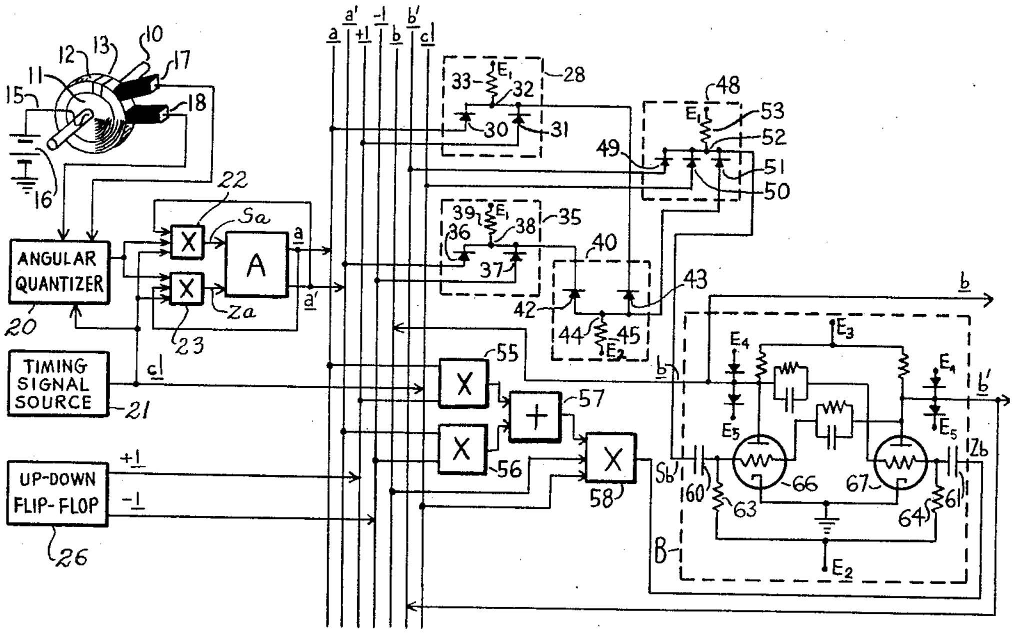

The present invention relates to the correlation of flip-flop and diode gating circuitry characteristics and, more particularly, to the use of flip-flops whose voltage swings approximate the voltage whereas the diodes used in associated gating circuitry exhibit their maximum back resistance.

An increasing number of modern digital computers employ vast arrays of "and" and "or" gating circuits connected in network form for triggering a series of computer flip-flops, the flip-flops, in turn, furnishing driving power for the gating network. In general, the number and placement of the various gating circuits are obtained from so-called logical or Boolean equations written, in turn, from truth tables setting forth the desired computer operations expressed in terms of flip-flop triggerings. In its most usual form, a typical "and" circuit includes a resistor connected at one end to a source of relatively high positive potential, and a plurality of diodes, each receiving an input signal from a flip-flop, mutually connected to the resistor's other end. A typical "or" gating circuit is similar to the "and" circuit except that the potential source is of negative polarity and the diodes are reversed in direction.

Assuming that the number of interconnections between the individual "and" and "or" circuits are known for a particular computing device, the major design problem remaining is the calculation of the various resistor values therein. These values are determined primarily by the flip-flop voltage swings, that is, the difference in magnitudes between its high and low output voltage levels, the back resistance characteristics of the diodes within the network, and the placement of the individual circuit whose resistor value is being calculated relative to the remaining circuits.

In the past, no attempt has been made to correlate the diode back resistance characteristic and the magnitude of the flip-flop voltage plate swings. As a result of this, extremely large amounts of current have been drawn and dissipated needlessly. This is fundamentally due to the fact that the back resistance curve of a typical diode begins at a relatively low back resistance at an extremely low back voltage and then increases almost linearly up to a maximum point but at still a relatively low back voltage. Past this point the resistance tapers off rapidly and, at a back voltage corresponding to the plate voltage swings utilized in present day computer flip-flops, has only approximately one-third the value of its maximum back resistance. Operating diodes at this point requires much smaller valued resistors in the gating circuits absorbing, in turn, needlessly large power quantities as well as causing excessive back currents to be drawn through the back biased diodes, the latter decreasing the diode life expectancies.

The present invention contemplates utilizing a flip-flop voltage swing close in magnitude to the voltage whereat the particular type of diode used in an associated gating network exhibits its maximum back resistance. For example, by having the flip-flop swing slightly less than the maximum back resistance voltage of the diode, possible diode failures of the type produced by deviations of the clamped flip-flop voltage levels are eliminated, and moreover, the gating network current and power requirements are minimized. The former saving is effected since an increase in clamp levels will cause the plate swing to fall on a higher resistance portion of the curve with less back current accordingly being drawn. In the normal case, such an increase would fall on a decreased resistance point with more current, more heating, less diode resistance, being cyclically produced with attendant danger of continuing regenerative action, and complete diode failure.

As an alternative, according to the present invention, the flip-flop swing may be made equal to the voltage at which the diodes exhibit their peak back resistance in order to achieve an optimum between the swing magnitudes and the minimized current requirements since the reliability of flip-flop triggering is generally considered higher for higher swings. In either case, owing to the minimized current drawn through the diodes, a considerable increase of diode life expectancy is obtained.

In order to set forth the principles involved in the present invention, the invention will be illustrated in connection with a simple digital computing device which includes an angular quantizer producing output signals in response to the rotation of a shaft. These output signals are then fed into a binary counter, only the first two stages being set forth, with the conduction state of an up-down flip-flop serving to selectively order the counter to either count up or count down the pulses received from the quantizer. The gating circuitry associated with the second flip-flop in the counter is then analyzed with respect to the resistor values therein, the values being calculated in accordance with the present invention and then compared to the values obtained if the design were carried out in accordance with conventional binary computing concepts.

It is, therefore, the principal object of the present invention to provide a digital computing device having a predetermined relationship between the plate voltage swings of its component flip-flops and the back resistance characteristic of crystal diodes utilized in an associated gating network.

Another object of the present invention is to provide a digital computing device having a plurality of electronic switching devices producing output voltage levels varying between two predetermined magnitudes and a gating network including a plurality of diodes, each of the diodes exhibiting a maximum back resistance at a back voltage approximately equal to the difference between said two predetermined magnitudes.

A further object of the present invention is to provide "and" and "or" gating circuits, each including a plurality of crystal diodes, for use with a plurality of input signals varying between first and second potential magnitudes, with the diodes exhibiting a maximum back resistance substantially at a voltage equal to the difference between said first and second potential magnitudes.

A still further object of the present invention is to provide a digital computing device employing flip-flops and a gating network, the design relationships between the two being such as to minimize the power requirements of the flip-flops and increase the life expectancy of the diodes in the gating network.

Figure 2:
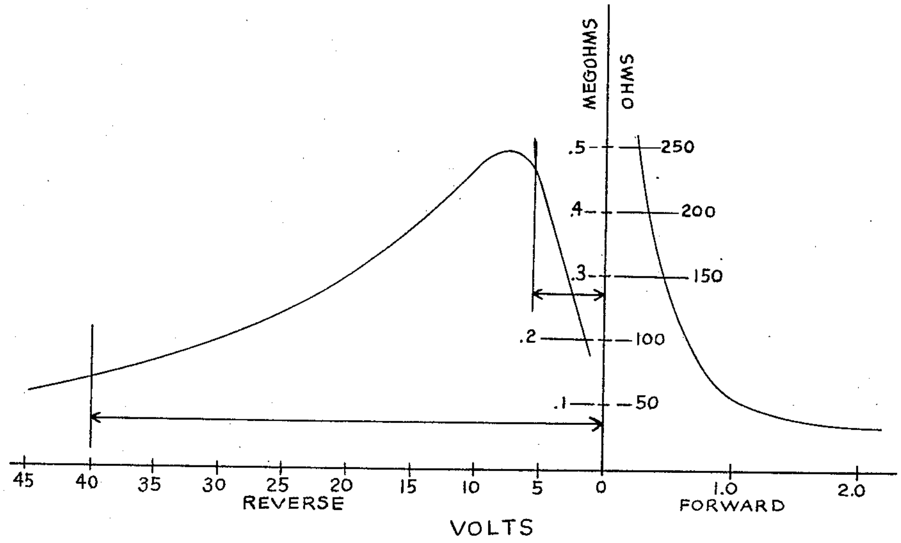

Other objects and features of the present invention will be readily apparent to those skilled in the art from the following specification and appended drawings wherein is illustrated a preferred form of the invention, and in which:

Figure 1 is a circuit diagram of a digital computing device illustrating the principles involved in the present invention; and Figure 2 is a graph on which there is plotted the forward and reverse voltage versus resistance characteristics of a typical germanium crystal diode.

Referring now to Figure 1 there is illustrated, by way of example only, a simple computing circuit of digital nature illustrating the principles involved in combining low plate voltage swing flip-flops and conventional "and" and "or" gating circuitry composed of diodes, especially of the germanium crystal type. Thus, there is illustrated a rotatable shaft 10 of conductive material having movement in the clockwise direction of rotation. Shaft 10 has a disk 11 attached thereto, disk 11 being likewise of conductive material and including a ring 12, of non-conductive material, extending around a major portion of the periphery thereof. A narrow conductive segment 13 extends from disk 11 to the outer periphery of ring 12 to form jointly a smooth outer surface. Contacting shaft 10 is a conductive spring loop 15 connected in turn, to the positive terminal of a source of potential, such as battery 16, the negative terminal thereof being grounded.

A pair of spaced brushes 17 and 18, respectively, make conductive wiping contact with the outer surface of disk 11 and, in turn, are conductively coupled to two of the input terminals of an angular quantizer 20, quantizer 20 being for example of the type described and illustrated in the copending U. S. application for patent, entitled "Quantizer," filed November 22, 1952, Serial No. 322,096, to Floyd G. Steele, now Patent No. 2,733,431. The other input terminal of quantizer 20 is coupled to the output terminal of a timing signal source 21 which may be, for example, a blocking oscillator, a multivibrator circuit, or a timing signal produced from the timing channel of an associated magnetic memory drum, not here illustrated. The output signal of quantizer 20, appearing on the signal conductor 21 in the above referred to application for patent, is applied to one input terminal of each of three terminal "and" gating circuits 22 and 23, respectively, another input terminal of each of circuits 22 and 23 being connected to the output terminal of timing signal source 21. Signals *a* and *a'* are applied to the remaining input terminals of circuits 23 and 22 respectively. "And" circuits 22 and 23 are each structurally similar to the later illustrated "and" gating circuit 48.

The output terminals of circuits 22 and 23 are coupled to the $S_a$ and $Z_a$ input conductors of a flip-flop A, flip-flop A, in turn, being similar to flip-flop B later illustrated in detail. The pair of complementary output signals *a* and *a'* produced by flip-flop A are applied to a pair of respective vertical busses for further application to the remaining illustrated circuitry. A counting control electronic switch, such as flip-flop 26, has its pair of complementary output signals, here designated +1 and −1, respectively, applied to another pair of vertical busses.

Considering now the gating circuits connected to the to the $S_b$ input conductor of the remaining electronic switch, such as flop-flop B, signals *a* and +1 are coupled through diodes 30 and 31, respectively, to the common junction 32 within an "and" gating circuit 28. Junction 32, in turn, is coupled through a resistor 33 to the positive terminal $E_1$ of a source of potential, not herein illustrated. Signals *a'* and −1 are coupled through a pair of diodes 36 and 37, respectively, to the common junction 38 within another "and" gating circuit 35, junction 38 being coupled through a resistor 39 to the $E_1$ terminal. The output signals appearing on junctions 32 and 38 of "and" circuits 28 and 35, respectively, are coupled through diodes 43 and 42, respectively, to the common junction 44 within an "or" gating circuit 40, junction 44 being coupled through a resistor 45 to an $E_2$ terminal of a source of negative potential, not here illustrated.

Signal *b'* taken from flip-flop B and signal *c*1 are applied through diodes 49 and 50, respectively, to a common junction 52 within a final or clock gating circuit 48. The output signal of "or" circuit 40, appearing on junction 44 thereof, is applied through a final diode 51 within circuit 48 to junction 52 therein. Junction 52 is coupled through a resistor 53 to the $E_1$ terminal, the output signal appearing on junction 52 being applied in turn to the $S_b$ input conductor of flip-flop B.

Considering now the gating circuitry connected to the $Z_b$ input conductor of flip-flop B, signals +1 and *a* are applied to the two input terminals of an "and" gating circuit 55, the output terminal of which is coupled to one input terminal of an "or" gating circuit 57. Signals −1 and *a'* are applied to the two input terminals of another "and" circuit 56, the output terminal of which is coupled to the remaining input terminal of "or" circuit 57. The output signal of "or" circuit 57 along with signals *b* and *c*1 are applied to the three input terminals, respectively, of a final "and" gating circuit 58. The output signal of "and" circuit 58 is applied to the $Z_b$ input conductor of flip-flop B.

Considering in particular now flip-flop B, its $S_b$ input conductor is connected to one plate of an input triggering capacitor 60, the other plate of capacitor 60 being coupled both to terminal $E_2$ through a grid resistor 63 and to the grid of a first triode 66. In the same way, the $Z_b$ conductor is coupled through a capacitor 61 to the grid of another triode 67 and is further connected to the $E_2$ terminal through another grid resistor 64, similar to resistor 63. In all of the remaining respects, flip-flop B is of a conventional design with the anodes of triode 66 and 67 being connected through respective plate resistors to the positive terminal $E_3$, of a source of potential, the source not being here illustrated. Also, the respective anodes and grids of triodes 66 and 67 are cross-coupled in conventional fashion by a pair of paralleled resistor-capacitor combinations. Signals *b* and *b'* are derived from the anodes of triodes 66 and 67, respectively, and are clamped at high and low voltage levels appearing on the $E_4$ and $E_5$ terminals of a pair of sources of positive potentials, respectively, the sources not being here illustrated.

Although the present invention is particularly directed to correlating the magnitude of a flip-flop's output signal swing with the back resistance characteristic of diodes utilized in associated gating circuits, rather than to the specific device herein set forth in Figure 1, for illustrating the principles involved it is thought well at this time to give a brief resume of the circuits' operation. Thus, shaft 10 in rotating in the clockwise direction alternately causes the voltage appearing on the positive terminal of battery 16 to be consecutively applied to brushes 17 and 18. Now, by having the voltage of battery 16 equal to the high voltage level present in flip-flops A and B as well as timing signal *c*1, each such consecutive brush-contact sequence will cause quantizer 20 to produce a high voltage level in its output signal for one timing interval, one timing interval, in turn, being equal to one cycle or adjacent high and low voltage level in the timing signal. Between such brush-sequence contacts, the output voltage of quantizer 20 will be at its low voltage level.

Now, owing to the connection of gating circuits 22 and 23, upon each appearance of a high voltage level in the output signal of quantizer 20, flip-flop A will change its conduction state and accordingly count the successive levels in a 0 to 1 to 0 to 1 manner as is always the case for the least significant digit count in a conventional binary counter. It is to be noted that the up-down flip-flop 26 is not utilized in this input triggering circuitry of flip-flop A inasmuch as the conduction state of flip-flop A must always be reversed in response to each quantizer 20 output signal regardless of the direction of count.

The conduction state of flip-flop B represents the next-to-least significant digit of the count and the gating circuitry connected to its $S_b$ and $Z_b$ terminals react to both the flip-flop A and flip-flop 26 conduction states to determine its triggering operations. Thus, when the up-down flip-flop is triggered such that its +1 output signal is high, then flip-flop B is triggered to count up such that the flip-flop A and B signals *a* and *b*, respectively, sequentially represent the counts of 00 to 01 to 10 to 11, etc. On the other hand, upon flip-flop 26 being in its other or off conduction state such that its output −1 signal is high, then flip-flop B is triggered to count down and signals *a* and *b* go from 11 to 10 to 01 to 00 to 11, etc. In the same way, if additional flip-flop stages were added to the present counter, then the circuitry triggering such additional flip-flops would be under control of flip-flop 26 such that the remaining stages would either count up or count down the rotations of shaft 10 as selectively determined by the conduction state of flip-flop 26.

As stated previously, the present invention is concerned primarily with relating the magnitude of flip-flop output signal swings with the particular back resistance characteristics of the crystal diodes utilized in "and" and "or" gating circuits employed in conjunction with such flip-flop output signals. With reference now to Fig. 2, there is illustrated the back resistance versus applied voltage characteristic curve of a typical crystal diode, such as the Sylvania 1N56 model. As shown in Fig. 2, the back resistance of this diode is approximately .25 megohm at the very low reverse voltage of 2½ volts. This resistance increases linearly up to approximately 7 volts at which point its value attains a maximum of approximately .5 megohm. This portion of the curve may be termed the positive slope portion since increases in the absolute value of an applied back potential produce increases in its resistance.

However, with a further increase in reverse voltage, the curve changes its slope to negative with the resistance accordingly decreasing substantially with increases in the applied reversed potential until at 40 volts, for example, its resistance has decreased to .15 megohm. Thus, it is seen that the back resistance is a maximum at approximately 7 volts and has decreased to less than one-third of its maximum value at 40 volts.

Broadly, according to the preferred view, for reasons of reliability to be set forth later, the present invention contemplates utilizing a flip-flop voltage swing of slightly less than the average maximum back resistance of the particular type of diode utilized in its associated gating circuitry. For example, in the computing device in Figure 1, if the Sylvania type 1N56 diode were used, then according to the curve of Figure 2, a flip-flop swing of approximately 6 volts would be combined therewith in accordance with the present invention. Thus, in considering again as an example only, the circuit of Figure 1, for use with this particular diode, the following table of potential magnitudes may be set forth:

$E_1$=90 volts
$E_2$=−45 volts
$E_3$=+45 volts
$E_4$=+28½ volts
$E_5$=+22½ volts For explaining the decreased power requirements, consider in the following example the calculations of the resistor values in gating circuits 28, 35, 40 and 48. Such an analysis begins with an empirical determination of the value of resistor 53 to be used in the final clock gating circuit 48, this determination being effected primarily by observing with an oscilloscope, the charging time of capacitor 60 and adjusting the value of the resistor until certain requirements are met. For example, this resistor should be of a sufficiently small value to allow the capacitor to become completely charged to the high voltage level at the end of any given timing interval that all signals applied to the circuit 48 terminals are at their high voltage level. If too small a resistor value were utilized, then the capacitor would be fully charged well in advance of the time of its discharge by the timing signal but it would, in so doing, require a much higher charging current than absolutely required and hence place a greater power drain on the $E_1$ terminal source of potential feeding it. On the other hand, if too large a value were employed, the power drain would be minimized but, at the same time, the triggering capacitor would not have time to be completely charged to the high level before its discharge by the timing signal. This, in turn, would result in smaller negative grid pulses and the flip-flop triggerings, in turn, would become unreliable. In the same way, the value of the clock gating circuit resistor affects the power requirements of the flip-flop feeding it. For example, if one flip-flop signal alone is holding the clock gate at its low level, then such is done by current from the flip-flop output terminal passing through the gating circuit diode, corresponding thereto, and from there through the gating circuit resistor to the $E_1$ terminal. Thus, if the resistor value were considerably lower than absolutely required for fully charging the triggering capacitor, an unnecessary large current drain would be exacted from that as well as each of the other flip-flops under similar circumstances.

Considering now as an actual example, resistor 53, hereinafter termed $R_{53}$, may be of an approximately 3.3 megohm value when used with the above given potential values and a 6 volt anode swing for flip-flop B. Once this value has been determined, the next problem involved is the calculation of the value for resistor 45, hereafter designated $R_{45}$, this calculation being made by considering the current flow from terminal $E_2$ through resistor 45 in "or" circuit 40, diode 51 in circuit 48, to common junction 52, assuming that junction 44 is at its low voltage level with signals *b'* and *c1* as applied to the remaining input terminals of circuit 48 being high. In other words, it is assumed that "or" circuit 40 alone holds the voltage on junction 52 at the low voltage level. Under this condition, the current flowing from terminal $E_2$ through diode 51 will branch in three directions, one portion going through $R_{53}$ to terminal $E_1$, another portion going through the back resistance of diode 50, with the final portion passing through the back-biased diode 49.

An examination of Figure 2 reveals that, at a back voltage of 6 volts, the back resistance of the 1N56 diode is approximately .45 megohm which corresponds to slightly over 13 microamps of current passing therethrough. Inasmuch as any given group of diodes will tend only to average around this figure of back biased current flow, that is, some will pass more current and some less current than the calculated 13 microamp value, a value of 17½ microamps is arbitrarily chosen for use in the subsequent calculations in order that those diodes which lie in the lower resistance range of expected deviations may be utilized in the circuitry.

Thus, the current passing from "or" circuit 40 through the back resistance of diodes 49 and 50 will be equal to two times 17½ or 35 microamps. In determining the current flow from circuit 40 through resistor $R_{53}$, it will be recalled that terminal $E_1$ is at +90 volts while junction 52 will be at 22½ volts. Thus, a potential difference of 90−22½ or 67½ volts appears thereacross and this value when divided by the value of $R_{53}$ or 3.3 megohms, yields approximately 20 microamps. Thus, the addition of this 20 microamps with the previously determined 35 microamps yields 55 microamps which, as stated previously, corresponds to the maximum current drawn through the "or" circuit resistor 45. From this, the value of this resistor, termed $R_{45}$, may be determined since the total potential difference between junction 44 and terminal $E_2$ will be 67½ volts which, when divided by 55 microamps, yields 1.2 megohms. In order, however, to take care of possible variations in the actual value of $R_{45}$, a 1 megohm value should preferably be used since, for example, if too high a value were utilized, then the calculated current drawn therethrough would be incapable of lowering junction 52 within circuit 48 to the designated 22½ volt level.

Since "and" circuits 28 and 35 are identical in all respects, resistors 33 and 39 therein will have the same value, the calculation of only one of which will be set forth here. Thus, considering circuit 28, assume that junction 32 is at the high voltage level and it alone holds junction 44 of "or" circuit 40 at the high level. In such a case, current flow will take place to terminal $E_1$ through resistor 33, hereafter termed $R_{33}$, diode 43, and from junction 44 will come from two different paths, one through resistor 45 from terminal $E_2$ and the other through the back resistance of diode 42. The current flow through resistor 45 will be equal to the total or absolute potential thereacross or 73½ volts divided by its value of 1 megohm which yields 73½ microamps. This, coupled with the normal back current of 17½ microamps through diode 42, yields a total current flow through $R_{33}$ of 91 microamps. The voltage across $R_{33}$ will, under the above stated circumstances, be equal to 61½ volts which when coupled with the 91 microamps passing therethrough yields a value of slightly under .67 megohm. Once more for the sake of insuring that circuit 28 is able to raise junction point 44 to the high level, an actual value of, for example, .6 megohm should be used for resistor 33.

Listing the above calculated resistor values for later comparison purposes:

$R_{53}$=3.3 megohms
$R_{45}$=1 megohm
$R_{33}$ and $R_{39}$=.6 megohm

In order to point out with great particularity the power savings incurred by employing the teachings according to the present invention over the conventional high voltage swing flip-flops presently employed in binary computers, assume by way of example that flip-flop B in Figure 1 as well as the similar flip-flops 26 and A were designed to have a 40 volt anode swing, the circuit potential sources having the following values:

$E_1$=+250 volts
$E_2$=−350 volts
$E_3$=+250 volts
$E_4$=+140 volts
$E_5$=+100 volts With the parameters given above, resistor $R_{53}$, as empirically determined, would have a value of approximately .4 megohm and, from Figure 2, the back current drawn at 40 volts through a typical 1N56 diode would be close to 270 microamps. In repeating the gating circuit resistor value calculations for this 40 volt circuit a back current flow of 350 microamps should be used as contrasted with the 17½ microamps previously set forth. The final resistor values for use with the 40 volt swing flip-flops, as calculated in the manner set forth above, are as follows:

$R_{53}$=.4 megohm
$R_{45}$=.6 megohm
$R_{39}$=.09 megohm
$R_{33}$=.09 megohm

As will be noted from the resistor values set forth above, and the previously tabulated values for the 6 volt flip-flop, the empirically determined clock gate resistor value sets the upper resistor value limit with the remaining resistor values being of successively lower magnitude as determined by their placement in the circuit. One primary reason that the clock gate resistor used with the 6 volt flip-flop is of a much higher value than the corresponding resistor used with the 40 volt flip-flop, lies in the charging potential applied to its associated triggering capacitor. This capacitor will charge from the 22½ volt to the 28½ volt level through the clock gate resistor from a source of 90 volts and hence will lie along a relatively short bottom portion having a steep slope of its resistance-capacitance charging curve. Accordingly, the resistor value may be made relatively high and yet permit the 6 volt change of capacitor charge to take place in sufficient time for the subsequent triggering operation.

Considered differently, the charge rise takes place up to 6 volts through a resistor connected to an equivalent 67½ volt source, the 67½ volts being the difference between 90 and 22½ volts. Thus, the charge need rise to only 1/10 of its ultimate value, this permitting the charging to be stretched in time by use of a relatively high valued resistor.

On the other hand, considering the 40 volt flip-flop, the charging must take place between 100 and 140 volts toward the 250 volt level of the $E_1$ terminal source. Thus, the 40 volt swing out of 150 volt difference requires a much longer relative proportion, more than ¼, of the charging curve than does the 6 volt flip-flop. Hence, in order to have the capacitor charged to the desired voltage at the end of the timing interval requires a faster charging rate, in turn produced by initially using a smaller resistor value.

It will be evident, of course, that if the same clock gate resistor value were to be used in both flip-flop designs, a much higher potential magnitude for the $E_1$ terminal source must be employed for the 40 volt flip-flop than herein set forth, it being over 500 volts, an unreasonably high value and requiring much higher flip-flop current drains for correct operation. Thus, it is seen that by employing a relatively small $E_1$ terminal potential, only 90 volts in the 6 volt flip-flop case, the initial clock gating resistor value used therewith is of a much higher value than that used with the 40 volt swing flip-flop employing a much higher $E_1$ potential, or 250 volts.

Recalling now that current flow through the diode nets takes two main routes, one being through the "and" and "or" circuit resistors and the other being through the back resistances of the various diodes therein, it is readily apparent that the flip-flop and gating circuit combinations when designed in accordance with the present invention, draw only a fraction of the current drawn in conventional circuits and hence dissipate only a fraction of the power thereof.

For example, the back current through each diode is reduced from 350 to 17 microamps or a factor of approximately 20 to 1 while the current flow, taking for example $R_{53}$, is reduced from 725 microamps to only 55 microamps or a factor of almost 15 to 1. When this saving, above set forth for only one diode and for one gating circuit resistor is multiplied a hundred or even a thousand fold, as it would be at any normal sized digital computer, the total power saving amounts to an extremely important factor in the overall design of the computer.

This overall power saving means that the power requirements of each flip-flop is greatly reduced and hence smaller tubes may be employed, having less filament drain and using smaller B+ voltages. Also, the need for amplifying the flip-flop output signals for driving diode gating circuitry is eliminated, and the computer power supply size requirements is greatly minimized. In fact, study indicates that small sized digital computers employing the design criteria of the present invention may be run entirely from batteries and hence may be made portable.

Another significant advantage attained by properly relating the flip-flop voltage swings and diode back resistance characteristics is the greatly lengthened diode life expectancy and subsequent decrease in diode failures. Experience indicates that using diodes under extremely low back voltage conditions tends to conserve their initial operating properties intact for greatly increased lengths of time over that obtained by employing them under more severe back voltage conditions, as presently done. Apparently, the prime reason for this exists in the reduced heating thereof resulting from the lessened power dissipation therein.

Also, catastrophic or instantaneous diode failures of one particular type will be likewise eliminated. For example, as will be appreciated, the heating of any crystal diode tends to reduce its back resistance. Now, if a diode were operating along the negative slope portion of the curve as is now done, and for any reason the clamping potentials were to deviate away from one another in magnitude, then the back voltage across the diode would increase with a resulting increase in current drawn therethrough. Such an increase in current would, by reason of the increased power dissipation, cause its temperature to increase, such an increase in temperature acting to reduce still further its resistance. In the event that the diode has a relatively steep negative slope, the interaction between lowered resistance, higher current, higher temperature, lowered resistance, etc., may become cumulative and the diode electrically destroyed in only a short period of time.

It may thus be seen that a danger of the above situation exists whenever diodes in a computer are operated along the negative slope portion of their back resistance curve. On the other hand, in accordance with the preferred view of the present invention, diodes should be operated at a back potential slightly lower than their maximum back resistance point such that, in the event of an increase between the clamped potential levels, the diode will exhibit an actual increase in its resistance and hence tend to draw less current and dissipate less power therethrough. Under operating conditions of this type, diode failures of the type noted above will be, for all practical purposes, eliminated and a much higher reliability of computer operation achieved.

According to the other view of the present invention, crystal diodes may be operated at substantially the extreme point of their maximum back resistance in order to obtain full benefit from the reduced current attendant therewith. This operating point permits slightly higher flip-flop voltage swings to be employed with a slightly increased reliability of the flip-flop triggering operation. This operating point is particularly suitable if the clamped flip-flop voltage deviations, in practice, are minimized.

What is claimed is:

1. In combination: a plurality of bistable elements for producing a corresponding plurality of pairs of complementary two-level signals; means for combining said signals to produce a composite two-level electrical output signal whose instantaneous voltage level is a function of the instantaneous voltage levels of said pairs of complementary signals, said means including a plurality of "and" and "or" gate circuits, each of said circuits including at least a pair of unidirectional current flow devices, each of said devices when back-biased exhibiting a maximum resistance at substantially the same predetermined voltage; and clamping means connected to each of said bistable elements for limiting the voltage difference between the voltage levels of said pairs of complementary signals to a value smaller than said predetermined voltage said clamping means including first means for clamping each output signal at its high level to a predetermined first voltage level and second means for clamping each output signal at its low level to a predetermined second voltage level differing from said first voltage level by less than the predetermined voltage.

2. The combination defined in claim 1 wherein said unidirectional current flow devices are germanium diodes.

3. A low power computer circuit comprising: a plurality of electronic bistable elements each having at least one input terminal and a pair of output terminals, said bistable elements being responsive to applied input signals for producing a corresponding plurality of pairs of complementary two-level output signals; a plurality of "and" and "or" gate circuits, each of said circuits including a pair of crystal diodes, each of said crystal diodes exhibiting a maximum back resistance when back-biased by a voltage of predetermined magnitude; means for coupling the output terminals of said bistable elements to said "and" and "or" gate circuits; and clamping means coupled to said output terminals of said bistable elements for restricting the voltage difference between the two levels of said output signals to a value approximately equal to said predetermined magnitude said clamping means including first means for clamping each output signal at its high level to a predetermined first voltage level and second means for clamping each output signal at its low level to a predetermined second voltage level differing from said first voltage level by substantially the predetermined magnitude whereby the power drain on said plurality of said bistable elements is substantially reduced.

4. The computer circuit defined in claim 3 wherein said clamping means includes a plurality of pairs of crystal diodes, one pair for each of said output terminals of said bistable elements, the anode of one diode of each pair being connected to the associated output terminal, a first source of relatively high potential connected to the cathode of said one diode of each of said plurality of pairs of diodes, and a second source of relatively low potential connected to the anode of said other diode of each of said plurality of pairs of diodes, the potential presented by said second source being lower than the potential presented by said first source by an amount slightly less than the value of the back-biasing potential whereat said crystal diodes in said "and" and "or" gates exhibit their maximum back resistance.

5. The computer circuit defined in claim 4 wherein said crystal diodes are germanium diodes and wherein the difference in potential between said first and second sources is of the order of 6 volts.

6. In combination: an "or" gate circuit including at least first and second crystal diodes, each of said diodes having a cathode and an anode and exhibiting a positive back resistance characteristic when back-biased to a predetermined voltage and a negative back resistance characteristic when back-biased beyond said predetermined voltage, and impedance means connected to the anodes of said crystal diodes; first and second switching devices for respectively producing two pairs of complementary two-level output signals; means for applying one output signal from each of said first and second switching devices to the cathodes of said first and second crystal diodes, respectively; and clamping means connected to said switching devices for limiting the voltage swing between the two voltage levels of said output signals to a value less than said predetermined voltage whereby each of said crystal diodes when back-biased is operative in the region of its positive back resistance characteristic.

7. In combination: an "and" gate circuit including at least first and second crystal diodes, each of said diodes having an anode and a cathode and exhibiting a positive back resistance characteristic when back-biased to a substantially common predetermined voltage and a negative back resistance characteristic when back-biased beyond said predetermined voltage, and impedance means connected to the cathodes of said crystal diodes; first and second switching devices for respectively producing two pairs of complementary two-level output signals; means for applying one output signal from each of said first and second switching devices to the anodes of said first and second crystal diodes, respectively; and clamping means connected to said switching devices for limiting the voltage swing between the two voltage levels of said output signals to a value less than said predetermined voltage said clamping means comprising first means for clamping each output signal at its high level to a predetermined first voltage level and second means for clamping each output signal at its low level to a predetermined second voltage level differing from said first voltage level by substantially the predetermined voltage whereby each of said crystal diodes when back-biased is operative in the region of its positive back resistance characteristic.

References Cited in the file of this patent

UNITED STATES PATENTS 2,644,887 Wolfe ------------------- July 7, 1953

OTHER REFERENCES

Radio-Electronics, "How an Electronic Brain Works," September 1951.